United States Patent [19]
Bourke et al.

[11] 4,217,529
[45] Aug. 12, 1980

[54] PROPULSION SYSTEM FOR ELECTRICAL VEHICLE

[75] Inventors: Robert F. Bourke, Kamiah, Id.; David M. Thimmesch, Elgin, Ill.

[73] Assignee: Gould Inc., Rolling Meadows, Ill.

[21] Appl. No.: 943,876

[22] Filed: Sep. 19, 1978

[51] Int. Cl.² ............................................. H02P 5/06
[52] U.S. Cl. .................................... 318/351; 318/424; 318/523; 318/332
[58] Field of Search ............... 318/337, 338, 351–354, 318/523–526, 530, 531, 405, 424–426, 332, 139

[56] References Cited
U.S. PATENT DOCUMENTS

| 2,706,008 | 4/1955 | Voigt | 318/521 |
| 3,223,909 | 12/1965 | Sensing et al. | 318/252 |
| 3,735,220 | 5/1973 | Renner et al. | 318/139 |
| 3,755,724 | 8/1973 | Anderson | 318/139 |
| 4,042,865 | 8/1977 | Gurwicz | 318/351 |

Primary Examiner—David Smith, Jr.

Attorney, Agent, or Firm—Charles S. Oslakovic; Russell E. Baumann

[57] ABSTRACT

A propulsion system for an electric vehicle in which a chopper is used to provide controlled DC power to a separately excited DC propulsion motor. In order to provide increased torque for comparatively short intervals to meet on-the-road requirements, the propulsion motor is provided with two sets of shunt field windings, and switch means are provided for connecting the windings in series or in parallel dependent upon the torque demands on the system. Normally the system is operated with the shunt field windings in series. To meet transient demands for increased torque, such as rapid acceleration from a stop light or improved gradability on hills, means are provided for detecting such increased torque demands and switching the field windings from series to parallel configuration thereby increasing the field flux and causing the motor to produce increased torque. The parallel connected field windings compensate for the demagnetizing effect of high armature currents without the need for a series field winding.

10 Claims, 4 Drawing Figures

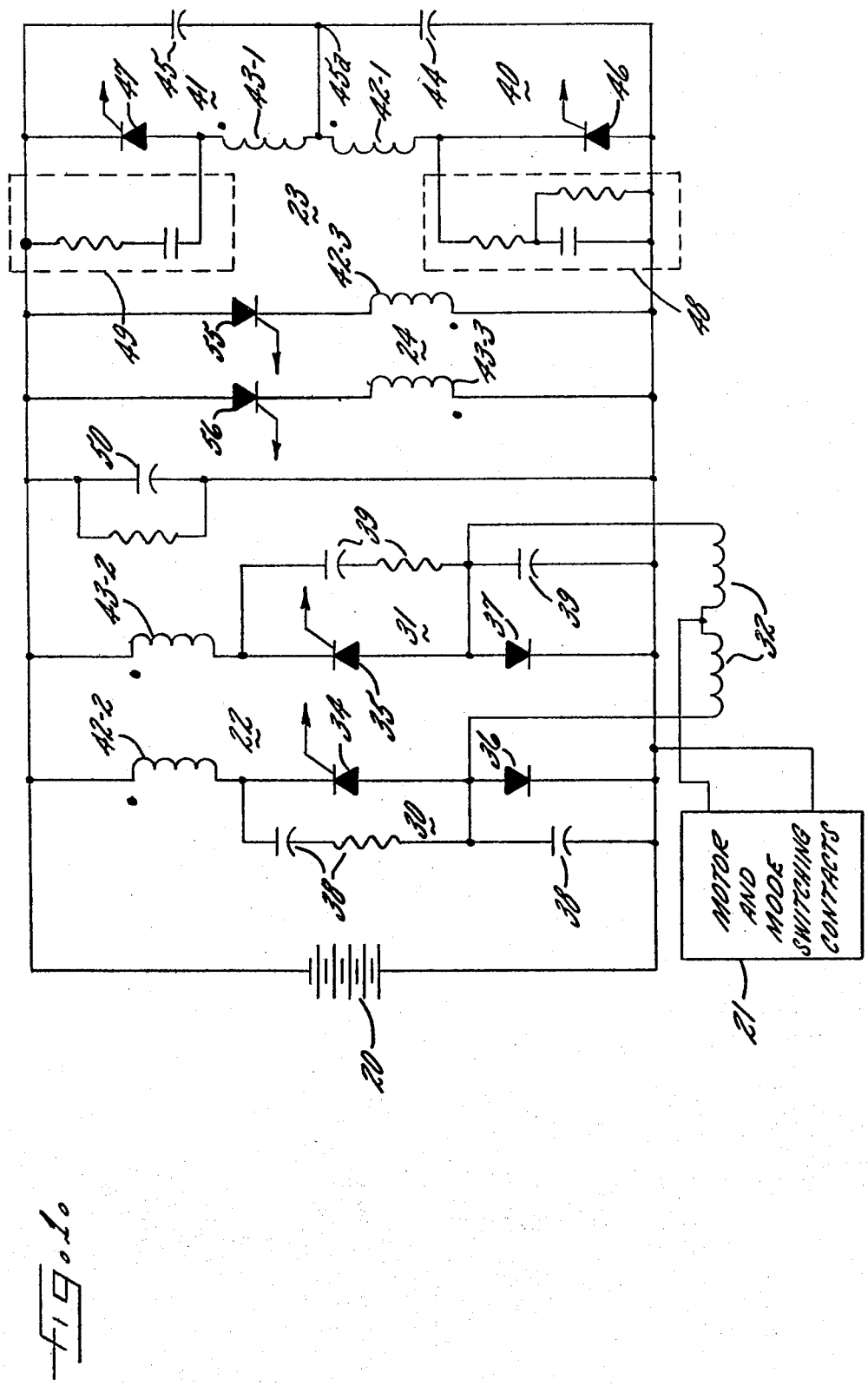

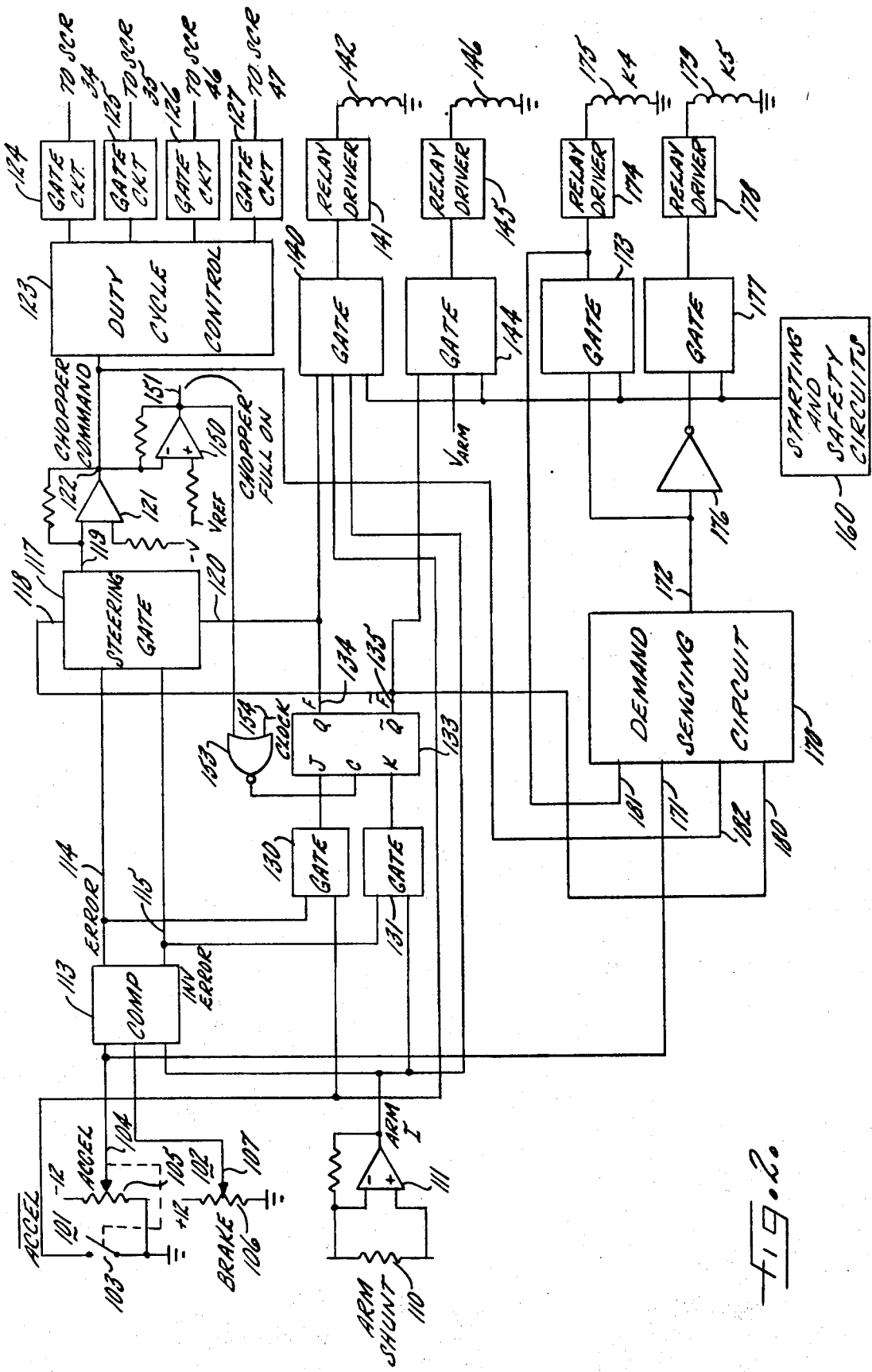

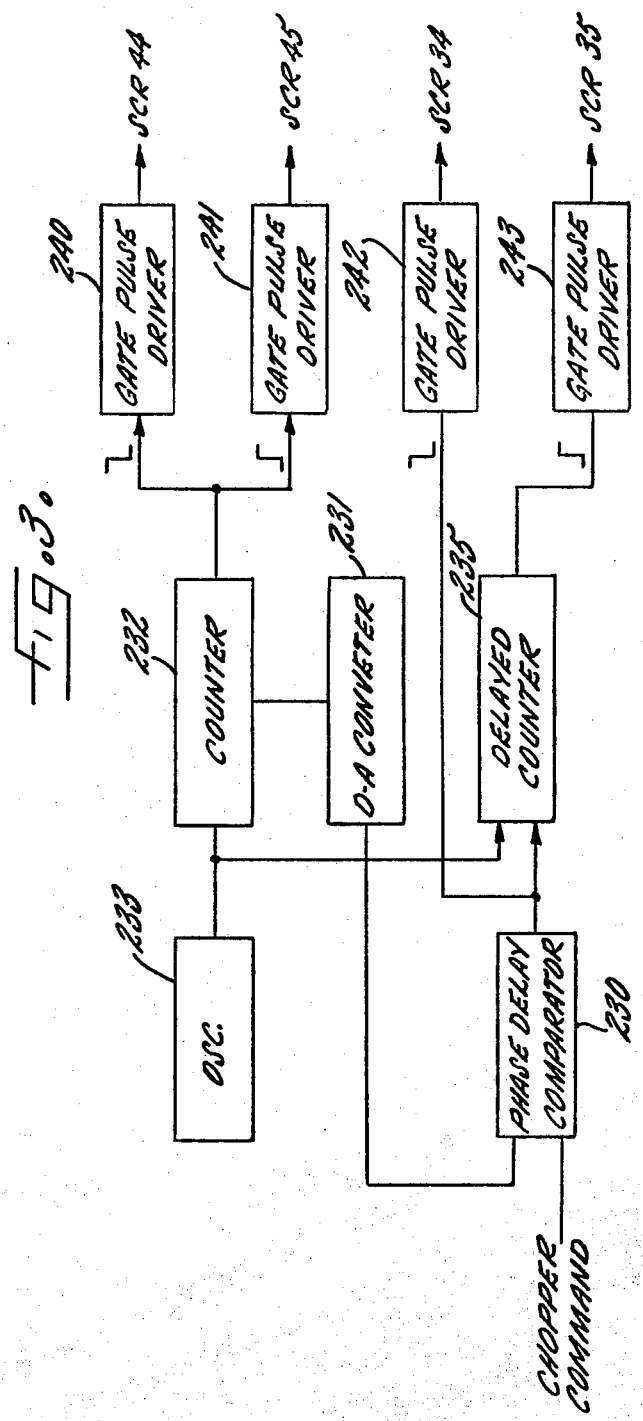

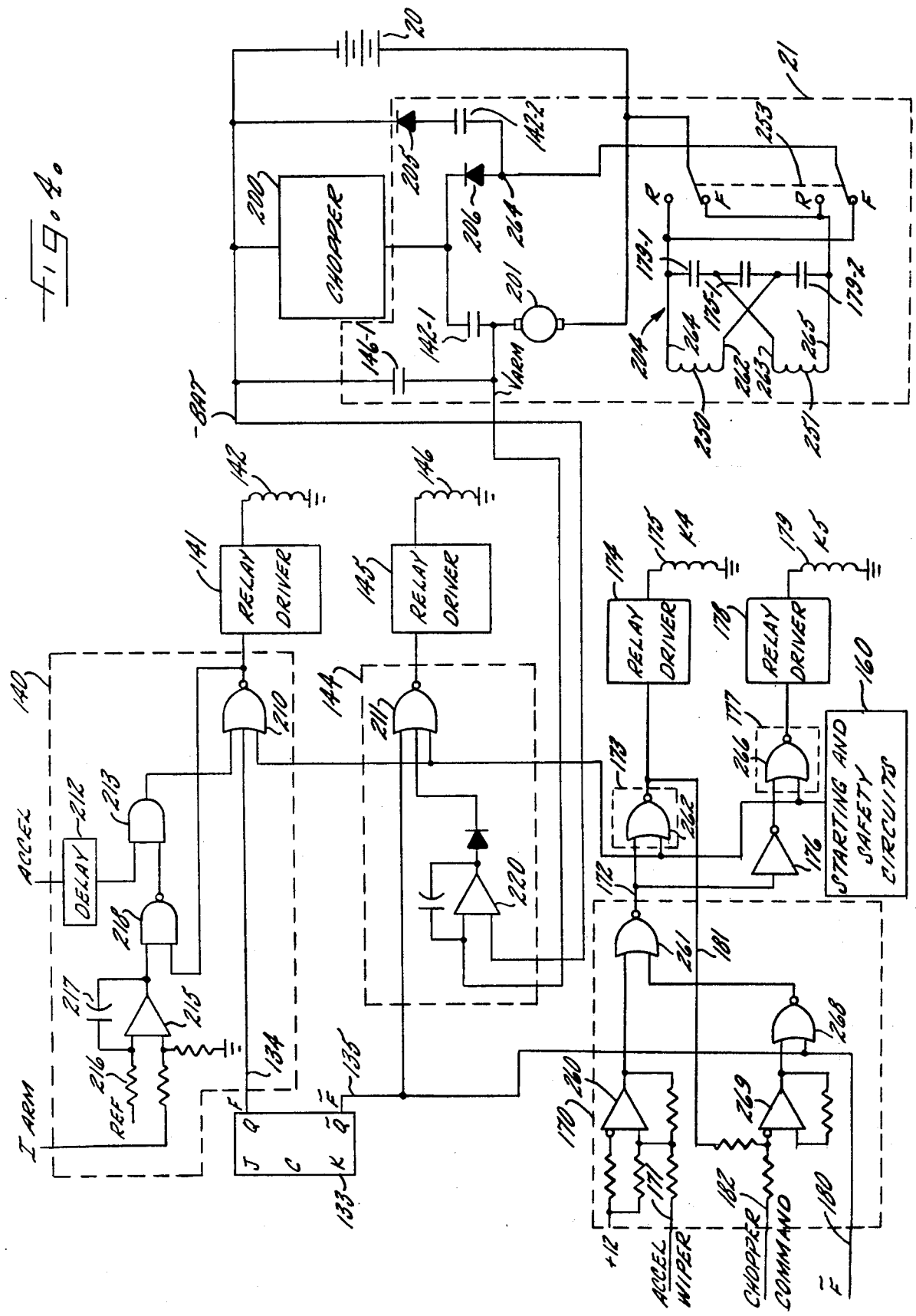

PROPULSION SYSTEM FOR ELECTRICAL VEHICLE

This invention relates to power controllers, and more particularly to such controllers having the capability to satisfy wide torque demands such as encountered in electric vehicles.

Electric vehicles, especially those designed for on-the-road use, impose severe requirements on the propulsion system. Due to economic considerations as well as to the need to minimize weight, it is desirable to use the capabilities of the propulsion system, such as the motor, the battery and the controller itself, to the maximum possible extent. And since the vehicle is expected to be in traffic heavily populated by internal combustion engine vehicles, it is desirable, for the comfort and safety of the driver, to provide capabilities, at least over the short term, equivalent to those of internal combustion engine vehicles. For example, the vehicle should be capable of normal acceleration from a stop light, as well as "emergency acceleration" sufficiently responsive to avoid dangerous situations which often times appear inevitable. But, as noted at the outset, it is desirable that such capabilities be provided without excessively increasing the cost or weight of the vehicle.

Christianson and Bourke U.S. Pat. No. 3,958,173 describes a power converter capable of use in an electric vehicle for controlling a DC propulsion motor. Christianson and Bourke U.S. Pat. No. 4,008,423 describes an electric vehicle using that converter and having mode switching means for control of the motor armature and the motor field in respective modes. The DC motor described in those patents has both series and shunt field windings. At times, when the motor is operated beyond its rated current, the series field windings are necessary to counteract the demagnetizing effect of high armature currents in order to maintain sufficient field flux to produce adequate torque. The series field was also thought necessary to maintain stability, especially in the higher speed range where control was accomplished solely through field weakening.

The series field was useful in that application, but it did require valuable space on the field poles because the wire size had to be sufficient to accommodate full armature current. In addition, the series field complicated reversing of the vehicle, requiring that the high current armature rather than the low current shunt field be reversed.

In view of the foregoing, it is an aim of the present invention to provide a propulsion system for an electric vehicle capable of delivering high armature currents to the propulsion motor, and having means for compensating for the demagnetizing effect of such high armature currents without the need for series field windings.

In accomplishing that aim it is an object of the present invention to provide a controller for a DC motor with at least two sets of shunt field windings and switch means normally connecting the windings in series but capable of temporarily connecting the windings in parallel for satisfying high torque demands.

According to a general aspect of the invention, it is an object to provide a propulsion system for an electric vehicle capable of temporarily overloading the motor in a controlled fashion for providing temporary intervals of increased torque.

In accordance with one feature of the invention, it is an object to provide all of the field flux with shunt field windings, eliminating the need for series field windings, and allowing reversing to be accomplished simply by reversing the low current field circuit.

Other objects and advantages will become apparent from the following detailed description when taken in conjunction with the drawings in which:

FIG. 1 is a schematic diagram illustrating the power portion of an electric vehicle propulsion system;

FIG. 2 is a block diagram showing control circuitry for the propulsion system;

FIG. 3 is a block diagram illustrating duty cycle control circuitry for the chopper; and FIG. 4 is a schematic diagram illustrating the power elements of the converter in conjunction with mode control circuitry for the converter and for the motor field.

While the invention will be described in connection with a preferred embodiment, there is no intent to limit it to that embodiment. On the contrary, the intent is to cover all alternatives, modifications and equivalents included within the spirit and scope of the invention as defined by the appended claims.

Turning now to FIG. 1, there is shown the power portion of the converter circuit in the environment of a battery powered electric vehicle including a main propulsion battery 20, a propulsion motor and its associated switching components indicated diagramatically at 21, a main chopper circuit 22, a commutating inverter 23, and clamp circuitry 24 for limiting the energy level in the commutation circuit 24. The propulsion battery 20 may be a conventional lead acid storage battery or other high energy density storage battery. In one embodiment of the invention it was found convenient to use a storage battery of about 65 volts nominal terminal voltage. As will be described in more detail in connection with FIG. 4, the propulsion motor 21 is a separately excited DC motor having a contactor switching arrangement for powering the motor in an armature control mode for low speed and high torque and in a field control mode for higher speeds.

The main chopper 22 is preferably configured as a dual chopper having a pair of legs 30, 31 driven out of phase with respect to each other and at a variable duty cycle, the outputs of the legs being combined in an interphase transformer 32. The legs include respective thyristors, shown herein as SCR's 34, 35 and associated free-wheeling diodes 36, 37. Snubbing components 38, 39 are provided for reducing transients.

Associated with the chopper 22 for switching the thyristors in the chopper off, a commutating inverter 23 is provided, having sections 40, 41 associated with the respective chopper legs 30, 31. The commutating inverter 23 is transformer coupled to the chopper, a first transformer having a primary 42-1 magnetically coupled to a secondary 42-2 serially connected in the chopper leg 30. Similarly, the section 41 has a transformer primary 43-1 magnetically coupled to a secondary 43-2 in the chopper leg 31. The commutating inverter also includes energy storage means shown herein as a pair of capacitors 44, 45 which resonate with the aforementioned primaries under the control of thyristors shown herein as SCR's 46, 47 for delivering energy to the associated legs of the chopper for commutation thereof. As in the case of the chopper, snubbing components 48, 49 are provided for reducing transients. In addition, a network including capacitor 50 is connected across the power supply near the commutating inverter for providing a low impedance AC path for charging the commutating capacitors.

The chopper and commutating inverter cooperate in the following manner to produce current pulses of controlled duration, combined by the interphase transformer for delivery to the motor. Assuming a point in the cycle at which SCR 34 is intended to become conductive, gating circuitry to be described below triggers the SCR 34 which causes current flow from the positive terminal of the battery 20, through the motor 21, the SCR 34, the secondary 42-2 to the negative terminal of the battery. At the point in the cycle where the current pulse is to terminate, the commutating SCR 46 is triggered. As a result of previous cycles of the commutating inverter, energy is stored in capacitors 44, 45 in the form of a voltage, with the junction 45a being negative with respect to the positive bus. As a result, when the SCR 46 is triggered, the voltage present on the capacitors instantaneously appears across the primary 42-1. By transformer action, a voltage determined by the turns ratio of the transformer 42 is induced across the secondary 42-2. That voltage, being properly polled, is sufficient to reverse bias the SCR 34, thereby commutating it. It is, of course, necessary to transfer sufficient energy through the transformer to maintain the reverse bias for a sufficient time, dependent on the conducting state of the SCR 34 to assure commutation of the SCR.

When the SCR 34 commutates, motor current continues to flow through the free-wheeling diode 36. Upon triggering of the SCR 46 in the commutating inverter, energy is transferred from the capacitors 44, 45 to the primary 42-1 as current flow increases through the SCR 46. After the capacitors are discharged, current flow will continue by virtue of resonance between the primary 42-1 and the capacitors charging the capacitors in the opposite direction. During the conducting interval of the SCR 46, energy is also flowing from the battery through the SCR 46 to charge the capacitors in preparation for the next commutating cycle. The chopper leg 31 cooperates with the commutating inverter section 41 in the manner just described.

Because the commutating inverter is a low loss circuit, especially in the case where the chopper load is light, at each resonant cycle the voltage at the junction 45a of capacitors 44, 45 will increase by about the magnitude of the battery voltage. If that voltage increase were allowed to go unchecked, it could reach potentially damaging levels. To prevent that a clamp circuit as described in the aforementioned patents can be used to limit energy buildup in the commutating inverter to a preset level. Preferably, however programmable commutation circuitry as described in our application Ser. No. 943,872, filed concurrently herewith, and entitled Power Converter With Programmable Commutation is used so as to enhance efficiency. More specifically, the respective transformers 42, 43 are provided with clamp windings 42-3, 43-3, arranged so that a voltage equal to the battery terminal voltage is induced therein rather early in the commutating inverter resonant cycle. In addition, there are provided a pair of gate controlled thyristors, shown herein as SCR's 55, 56, serially coupled with the respective clamp windings 42-3, 43-3 across the battery 20. Means are provided responsive to the operating level of the chopper 22 for gating the SCR's 55, 56 to clamp the voltage in the commutating inverter at a programmed point dependent upon such operating level. Since the clamp circuitry forms no part of the present invention, further detail will not be provided herein. The reader is referred to said application for a more complete description of that invention.

Turning now to FIG. 2, there is shown in simplified block diagram form the control circuitry for operating the power elements illustrated in FIG. 1. For allowing an operator to control the speed of the vehicle, accelerator controls 101 and brake controls 102 are provided. The accelerator controls comprise a switch 103 ganged to the wiper 104 of an accelerator potentiometer 105. When the accelerator pedal is depressed the switch 103 is closed, making the ACCEL signal low; the signal on the acceleration wiper 104 becomes increasingly negative with increased depression of the accelerator pedal. The brake control 102 is a potentiometer 106 having a wiper 107, the output signal of which becomes increasingly positive with increased depression of the brake pedal.

The preferred control system operates to produce an armature current in the propulsion motor which matches a demanded current, such current being demanded by either the position of the accelerator potentiometer 104 or the brake potentiometer 107. For sensing the actual armature current for comparison against the demanded current, an armature shunt 110 is provided, in series circuit relationship with the propulsion motor armature, and having a buffering amplifier 111 connected thereto for producing a signal indicative of actual armature current flow.

The demand signals from the accelerator and brake potentiometers and the actual signal from the armature shunt are coupled to a comparator 113 which compares the demand signal with the actual signal to produce an error signal on line 114 and an inverted error signal on line 115. When the accelerator is depressed, the negative signal from the potentiometer 105 is compared with the positive output of the scaling amplifier 111 which results from armature current flow to the motor. When the brake pedal is depressed, the positive signal from the potentiometer 106 is compared with the negative output of amplifier 111 which results from current flow from the motor to the battery. The comparator, in response to such conditions produces an error signal on line 114 indicative of the difference between the compared signals, and by virtue of an internal unity gain inverter, also produces an inverter error signal on line 115. Both of such signals are coupled as inputs to a steering gate 117 which selects one or the other of such signals for controlling the operating level of the power converter. The particular signal selected is dependent upon the mode in which the controller is operating at the time. In the armature control mode, the input 118 of the steering gate 117 is maintained in a high logic condition which causes the steering gate to pass the error signal 114 to its output 119. When operating in the field control mode, the input 118 is low, but the input 120 is maintained high, causing the inverted error signal on line 115 to be passed to the output 119. The signal passed by the steering gate 117 is buffered in an amplifier 121 to produce a chopper command signal on output line 122, such signal being coupled as a control input to the duty cycle control 123. As will be described below, the duty cycle control 123 acts through gating circuits 124–127 to trigger SCR's 34, 35, 46, 47 to control conduction in the respective legs of the chopper and thereby the duty cycle of the chopper.

Because the controller has two modes, namely armature and field control, it is necessary for the duty cycle control 123 to respond differently in such modes to the error signal produced by the comparator 113. In the armature control mode, the non-inverter error signal is steered by virtue of the control input 118 through the steering gate to cause the duty cycle control 123 to increase the duty cycle from minimum toward maximum for increasing levels of error signal. However, in the field control mode, where the motor is controlled by field weakening, it is necessary to decrease the duty cycle to produce increased armature current. As a result, in the field control mode the inverted error signal 115 is passed through the steering gate 117 to cause the duty cycle control 123 to decrease the duty cycle of the chopper to produce increased armature current.

Means are provided for establishing the mode of the controller, not only to pass the appropriate signal through the steering gate 117, but also to control the power portion of the circuitry, described in connection with FIG. 1, to connect the motor armature and field to the controller and battery as required by the respective modes. To that end a pair of gating circuits 130, 131 are provided having inputs responsive to the error signal on line 114 and the inverted error signal on line 115, respectively, and having outputs coupled to the J and K inputs of a flip flop 133. The Q output 134 of the flip flop is high in the field control mode and low in the armature control mode. The $\bar{Q}$ output 135 assumes the opposite condition, such that it is low in the field control mode and high in the armature control mode. It is seen that the Q and $\bar{Q}$ outputs are the inputs 120, 118 respectively of the steering gate such that the error signal is passed through such gate in the armature control mode and the inverted error signal in the field control mode. The gate 130 is also connected to the accelerator switch 103, and the gate 131 connected to receive the armature current signal produced by the amplifier 111.

In operation, when the circuit is at rest, the flip flop 133 is maintained in its reset condition which, as will now be understood, establishes the armature control mode. The input 118 of the steering gate allows the error signal on line 114, if one is generated, to be passed to the duty cycle control 123. The Q output of the flip flop 133 provides an enabling signal to a gating circuit 140 connected to energize a relay driver 141 when the accelerator switch 103 is closed, which in turn energizes a relay coil 142 for closing contacts in the power circuit to set the circuit up in the armature control mode. The $\bar{Q}$ output of the flip flop 133 prevents gating circuit 144 from being energized, which maintains relay driver 145 and associated coil 146 de-energized. As will be noted below, this condition causes the chopper to be connected to the motor armature and the battery connected directly to the motor field.

When the accelerator is depressed the comparator 113 senses the demand for armature current and compares it to the actual armature current to produce a positive error signal 114 coupled through the steering gate 117 to cause the duty cycle control 123 to increase the duty cycle of the chopper, thereby to increase the armature current. The vehicle accelerates and armature current increases until it reaches the demanded level. However, if the duty cycle of the chopper reaches 100%, that is the controller is operating at maximum level, that condition will be sensed by an amplifier 150, responsive to the chopper command signal 122, which will respond by producing a low chopper-full-on signal at output 151. That signal enables a NOR gate 153 to pass a clock signal derived from any convenient pulsed source 154 to clock the flip flop 133.

In the condition just described, assuming that the chopper has been run up to 100% duty cycle and additional armature current is demanded, the positive error signal coupled to the gate circuit 130 in combination with the logic zero $\overline{ACCEL}$ will maintain the output of gate 130 high. Similarly, the negative inverted error signal applied to the gate 131 will maintain that gate output low. The flip flop 133 when clocked with such signals on its J and K input will respond by shifting its Q output high and $\bar{Q}$ output low, thereby causing the system to enter the field control mode. As a result, the inverted error signal on line 115 will be passed through the steering gate 117, causing a reduction in duty cycle of the chopper, and thereby a further increase in armature current. When the flip flop 133 changes states, the Q and $\bar{Q}$ outputs acting respectively on gates 140, 144 cause the relay driver 141 to be de-energized and the relay driver 145 to be energized. As will be noted below, such condition causes the controller to be switched across the motor field and the battery to be connected directly to the armature.

Mode switching from the field control mode to the armature control mode occurs in a similar manner. Assuming that the system is in the field control mode, and that the actual armature current is greater than demanded, the inverted error signal 115 will act through the steering gate 117 to cause the duty cycle control 123 to increase the duty cycle of the chopper, thereby reducing the armature current. When the chopper-full-on signal at the output 151 of amplifier 150 is produced, it again allows clocking of the flip flop 133. However, when that clock signal is produced, the negative state of the error signal on line 114 causes the output of gate 130 to be maintained low, whereas the positive state of the inverted error signal on line 115 causes the output of the gate 131 to be high. As a result, the clock signal will cause the flip flop to respond by switching its Q output low and $\bar{Q}$ output high, thereby returning to the armature control mode. The steering gate 117 and relay drivers 141, 145 respond in the manner described heretofore.

Control of the gates 130, 131 by the error and inverted error signals has been described. The gate 130 also has an input driven by the $\overline{ACCEL}$ signal which maintains the gate output low unless the accelerator is depressed, in order to prevent switching to the field control mode except when the accelerator is depressed. The gate 131 also has a second input which is connected to the armature current signal produced by the amplifier 111. Such signal prevents the gating circuitry 130, 131 from switching from the field to the armature control mode during regenerative braking until the current being returned to the battery falls to a predetermined level such as 60 amps.

The gates 140, 144, in addition to being driven by the Q and $\bar{Q}$ outputs of the flip flop 133 have additional inputs which will be described in greater detail with reference to FIG. 4. Suffice it for the moment to note that the $\overline{ACCEL}$ signal is coupled to the gate 140 so that when the accelerator is depressed in the armature control mode the gate 140 is enabled, thereby to energize the relay driver 141. The armature current signal produced by the amplifier 111 is also coupled to the gate 140, and serves to maintain the gate locked in until armature current falls below a predetermined level. Both the gates 140 and 144 have inputs connected to a starting and safety circuit 160 such that both gates are disabled until an active signal is produced by the starting and safety circuit. The details by which such signal is produced are not material to an understanding of the present invention. Suffice it to note that the signal is produced when the operator follows a preset procedure in "starting" the vehicle and appropriate safety sensing circuits are in their proper condition. The gate 144 has a futher signal responsive to the armature voltage, representing a further safety feature, which prevents mode switching to the field control mode under conditions to be specified below.

In accordance with the present invention, means are provided for sensing the torque demanded of the system, and in response to the demand reaching a predetermined level, altering the actual configuration of the motor to allow temporary overload in order to meet the increased torque demand. As will be described in connection with FIG. 4, field flux for the motor is provided solely by a shunt field comprising at least two sets of shunt field windings, with the windings constructed and arranged for normal operation when connected in series. When very high armature currents are flowing in the motor in an effort to meet a demand for high torque, such currents tend to demagnetize the field, preventing the motor from delivering the demanded torque. In order to provide the required torque without resort to series field windings, the dual set shunt field is provided with switch means for temporarily connecting the sets of field windings in parallel, thereby to effectively double field current and increase field flux to compensate for the armature current caused demagnetization.

FIG. 2 shows the control elements for field switching and the interconnections thereof with the remainder of the control circuit. A demand sensing circuit 170 is provided having an input 171 connected to the wiper 104 of the acceleration potentiometer 105. The sensing circuit 170 monitors the armature current demand signal on input 171 and reacts to that signal exceeding a predetermined level to initiate field switching. In one embodiment of the invention, it was found convenient to set the reaction level at about 430 amps demanded armature current. In the normal condition the demand signal on input 171 is below that level, causing the sensing circuit output on line 172 to assume a low logic level which activates a gate circuit 173 to energize a relay driver 174 and in turn relay coil 175. Contacts associated with the relay coil 175 maintain the shunt field sets in the normal series condition. The low signal on output 172 also acts through inverter 176 to maintain a gate 177 disabled, thereby maintaining a relay driver 178 de-energized along with its associated relay coil 179. Contacts associated with the relay coil 179 are used to switch the shunt field sets into parallel. During the time the demand signal on input line 171 is above threshold level, the gates 173, 177 assume the opposite condition, energizing relay 179 and de-energizing relay 175 to switch the shunt field sets from series to parallel.

Because in the field control mode the controller must reduce field flux in order to increase armature current, and because switching to parallel field increases rather than decreases field flux, means are provided for preventing entry into parallel field in the field control mode. Accordingly, the demand sensing circuit 170 has a disabling input 180 connected to the $\overline{Q}$ output of the flip flop 133 so as to prevent the system from entering the parallel field mode when operating in field control. If the demand signal threshold is exceeded after the controller enters the field control mode, the controller responds in the normal manner by reducing duty cycle to reduce field and increase armature current.

Although the controller cannot switch to parallel field in the field control mode, means are provided for allowing parallel field to be maintained through an armature to field control mode switch. To that end, the demand sensing circuit 170 has an input 181 connected to the output of gate 173 which tends to hold the sensing circuit in the activated mode once entered, even after a switch from armature to field control mode (unless, of course, the demand signal falls below threshold). A further input 182 acts in conjunction with the input 181 to terminate parallel field operation after the chopper duty cycle falls below 50%. The input 182 is connected to the chopper command signal produced on the output 122 of amplifier 121. As noted previously the chopper command signal has an analog level related to the operating duty cycle of the controller. When the duty cycle falls to a predetermined level below 50% in the field control mode, the input 182 causes the demand sensing circuit 170 to drive its output low irrespective of the level of the demand signal so as to unconditionally return to the series field mode. Because the chopper is operating at less than 50% duty cycle, it is applying less than one half the battery terminal voltage to the parallel fields; the same field flux can be achieved by return to series mode and increasing the operating level of the chopper. It is to be realized that such a switch cannot be made until the duty cycle falls below 50% because the required level of field flux could not be maintained. For example, assuming a demand signal in excess of the threshold is maintained during the following chain of events, the system will respond in the armature control mode by switching to parallel field and increasing duty cycle to 100%. A switch to field mode will be executed with the field remaining in parallel. If at say 60% duty cycle the controller restored the series mode, field flux would be reduced and armature current would attempt to increase beyond the demanded level. The controller would respond by increasing the duty cycle to 100%, then switching to armature control. Once in armature control, the controller would return to parallel field causing a mode switch back to field control. The controller would continue to oscillate between modes for so long as the high demand signal was maintained. To prevent such an occurrence, switching from parallel to series field in field control (assuming a demand in excess of threshold) is not allowed until chopper duty cycle falls below 50%, so that the chopper can provide the required field flux in the existing control mode.

Before considering the detailed structure of the mode switching circuitry, since the exemplary power converter utilizes a variable duty cycle chopper, a brief description of the duty cycle control will be provided. Turning to FIG. 3, there is shown in block diagram form the duty cycle control for the chopper. Reference can be made to the aforementioned patents for a more detailed description of the circuitry. The chopper command signal described in connection with FIG. 2 is applied as an input to a phase delay comparator 230. Such signal is compared to an analog signal produced by D/A converter 231 which responds to the digital output of a counter 232 to produce a negative ramp signal as the counter fills. The counter 232 has its clock input coupled to a stable oscillator 233 which provides the main clock signal for the chopper. The oscillator 233 also has its output connected to a delayed counter 235. The delayed counter 235 has an enabling input connected to the phase delay comparator 230.

In operation the oscillator 233 continues to cycle the counter 232 to produce a square wave output of about 400 Hz. Negative transitions of the square wave activate a gate pulse driver 240 to gate the commutating SCR 44 whereas positive transitions energize a gate pulse driver 241 to gate the commutating SCR 45. Accordingly, the commutating SCR's are driven at a fixed frequency and 180° out of phase. The duty cycle of the chopper is controlled by varying the incremental time in advance of firing the commutating SCR's at which the associated chopper SCR's are fired. To that end the phase delay comparator 230 responds to the level of the chopper command signal and the negative ramp signal produced by the D/A converter 231, which in turn is responsive to the count within the cycling counter 232. When such signals are in a predetermined correspondence the phase delay comparator 230 produces an output signal which energizes gate pulse driver 242 to fire the chopper SCR 34. At the same time the phase delay comparator 230 removes a reset signal from the delayed counter 235 enabling it to count pulses produced by the oscillator 233. When the delayed counter 235 fills it produces an output signal which energizes gate pulse driver 243 to gate the chopper SCR 35. The counter 232 and delayed counter 235 have the same number of binary stages such that the delay period during which the delayed counter 235 is held in reset by the phase delay comparator serves to slave the SCR 35 to the conducting interval of the SCR 34. When the chopper is operating at relatively low duty cycles, the counter 232 is allowed to advance well into its count before the phase delay comparator produces a signal to trigger the SCR 34 and remove the reset from the delayed counter 235. As a result, the commutating SCR 44 will be fired quite soon after firing the chopper SCR 34 so that the conducting interval of the leg of the chopper will be relatively short as compared to the overall period. When high duty cycles are demanded by the chopper command signal, the phase delay comparator will trigger the gate pulse driver 34 and remove the reset from the delayed counter 235 quite early in the period, so that the SCR 34 is conductive for a considerably longer proportion of the total operating period. As noted above the SCR 35 is slaved to the operating period of the SCR 34 by the delayed counter so that the duty cycles of the respective legs are matched.

Turning now to FIG. 4, there are shown the mode switching elements in greater detail juxtaposed with the power switching elements in the chopper and motor circuitry. The mode control flip flop 133 is shown having a Q output 134 connected to gate circuitry 140 and a $\bar{Q}$ output 135 connected to gate circuitry 144. The associated relay drivers 141, 145 and relay coils 142, 146 are also illustrated. Relay 142 has two sets of contacts, a first set 142-1 serving to connect the motor armature 201 directly to the output of the chopper 200, while a second set 142-2 connects the motor field circuit 204 to the negative terminal of the battery 20 via a protection diode 205. The diode 205 is interposed to protect a switching diode 206, during the time the contacts 142-2 are closed, from high negative transients which might be generated by the armature 201. The relay 146 has a single set of contacts 146-1 which serve to connect the motor armature 201 directly to the negative terminal of the battery 20. Switch means for the field circuit 204 in the field control mode comprises a diode 206 which becomes forward biased after the armature control mode relay 142 is deenergized, imposing the output of the chopper 200 across the motor field circuit 204.

As described in the aforementioned patents, in order to efficiently combine the capabilities of the chopper and the separately excited DC motor, means are provided for operating the system in an armature control mode wherein the chopper is connected to the motor armature while the battery is connected directly across the field, and for operating the system in a field control mode wherein the armature is connected directly to the battery while the chopper is connected to the motor field. To that end, when the armature mode relay 142 is energized, contacts 142-1 connect the chopper to the motor armature and contacts 142-2 connect the field circuit directly across the battery. Also as noted in the aforementioned patents, mode switching occurs only when the chopper is at maximum operating level. In that condition the output of the chopper and the battery are at substantially the same potential, such that the mode switching contacts are not subjected to great electrical stresses. To switch from armature to field control, the relay 146 is energized, closing contacts 146-1, thereby connecting the armature 201 directly across the battery. Switch means for the field comprise diode 206 which connects the motor field circuit 204 to the chopper 200. Relay 142 is de-energized, opening the contacts 142-1, thereby disconnecting the armature from the chopper, and opening contacts 142-2 which thereupon forward biases the diode 206 such that the chopper controls the field current.

The gate circuits 140, 144 which control mode switching of the power contacts are illustrated in greater detail in FIG. 4. The mode control flip flop 133 has Q and $\bar{Q}$ outputs 134, 135 respectively which serve as mode switching inputs to the gate circuits 140, 144 respectively. It is seen that the Q output 134 is connected to a multiple input NOR gate 210 while the $\bar{Q}$ output 135 is connected as an input to NOR gate 211. The starting and safety circuits 160 are connected to each of the gates 210, 211 and serve as a gross enabling signal. Whenever the starting and safety circuits are satisfied, the contacter enable output is low, providing a preliminary enabling signal for the NOR gates 210, 211. With the system at rest the Q output 134 is low and the $\bar{Q}$ output 135 is high. When the accelerator is depressed the $\overline{ACCEL}$ signal is brought low. That low signal passes through delay circuit 212 to produce a low on the input of AND gate 213. The output of such gate thereupon switches low, causing the output of NOR gate 210 to switch high. The high signal at the output of NOR gate 210 activates the relay driver 141 which energizes the relay coil 142, closing the contacts 142-1 and 142-2, setting the power circuit up in the armature control mode.

As described in connection with FIG. 2, the appropriate portion of steering gate 117 is activated, causing the production of a chopper command signal which causes the duty cycle control 123 to increase duty cycle so as to produce an armature current matching the demanded armature current established by acceleration potentiometer 105. If the duty cycle advances to 100% and additional acceleration is demanded the flip flop 133 will be clocked as described previously. As a result the Q output 134 is driven high, causing the output of NOR gate 210 to swing low. That deactivates the relay driver 141 and de-energizes relay 142. Additionally, the low $\bar{Q}$ output is applied as an input to NOR gate 211, causing the output of such NOR gate to swing high, activating relay driver 145 and energizing relay coil 146. The contacts in the power circuit switch as described previously to establish the power portion of the circuit in the field control mode. The steering gate 117 passes the inverted error signal to reduce the duty cycle of the chopper via duty cycle control 123 until the actual armature current matches the demanded. Mode switching from field to armature control mode occurs in a similar manner upon clocking of the flip flop 133 to reverse the condition of Q and $\bar{Q}$ outputs 134, 135, thereby to activate relay driver 141 and deactivate relay driver 145.

The additional inputs to NOR gates 210, 211 are provided for purposes now to be described. Initially, it is noted that the delay circuit 212 provides a delay on de-activation such that if the driver removes his foot from the accelerator while in the armature control mode, the output of AND gate 213 will switch high only after a predetermined delay. Additionally a sensing ampifier 215 is provided which matches the armature current signal against a predetermined reference 216 so as to prevent dropout of the armature control relay 142 until armature current has decayed to a predetermined level. To that end, the armature current signal is connected as an input to amplifier 215 which matches such input against reference 216. Capacitor 217 is provided for a slight integrating effect. The output of the amplifier serves as an input to NAND gate 218 which has a second input driven by the output of NOR gate 210. As a result, when the armature control mode is entered, the high output of NOR gate 210 provides an enabling signal to NOR gate 218. With armature current above the reference level the second input to NAND gate 218 is also high. As a result the output of NAND gate 218 will remain low, maintaining the output of AND gate 213 low and thereby the energization of relay 142. Even if the driver removes his foot from the accelerator, causing the $\overline{ACCEL}$ signal to switch high, the NAND gate 218 will maintain relay 142 energized until armature current drops below the reference level, at which time the associated input of NAND gate 218 will switch low and cause the output of AND gate 213 to switch high. That high signal acts through NOR gate 210, switching its output low and de-energizing the relay driver 141.

An amplifier 220 is provided having an output connected to an input of NOR gate 211 to serve a safety function now to be described. Stated simply, the amplifier 220 compares the voltage across the armature to that of the negative terminal of the battery and prevents switching from armature to field control mode when the armature voltage is greater than the battery voltage indicating a high back EMF. Such circuitry prevents switching to field control mode in an unusual situation where the motor is developing a high counter EMF but the other elements of the mode switching circuitry fail to detect such condition. For example, if the vehicle is coasting at relatively high speeds (say 40 miles per hour) and the operator removes his foot from the accelerator, the controller can switch from field to armature control mode, the duty cycle can be reduced and the controller can ultimately open relay 142. If the vehicle is coasting such that it maintains speed, when the operator later depresses the accelerator, the circuitry detects a demand for armature current. However, because the motor back EMF is greater than the battery voltage, current cannot flow to the armature, and in attempting to produce armature current to match the demand signal, the controller will increase the duty cycle to full-on and attempt a switch to the field control mode. If such switch were allowed, the armature would be imposed directly across the battery with full field, generating substantial regenerative braking currents due to the high motor speed. To prevent such an occurrence the amplifier 220 maintains a high output signal until the voltage across the armature approaches the negative battery terminal voltage, indicating a safe condition. Mode switching will then occur in the normal fashion.

Turning now to the field switching circuitry according to the present invention, FIG. 4 shows the motor field circuit 204 as including two sets of shunt field windings 250, 251. In the case of a four pole motor, for example, the sets 250, 251 can each include two opposed polls. Switch means comprising contacts 175-1 associated with relay coil 175 are provided for normally connecting the winding sets 250, 251 in series. Additional switch means in the form of contacts 179-1, 179-2, associated with relay 179, when closed serve to connect the winding set 250 in parallel with the winding set 251. Accordingly, control of relays 175, 179 determines the series or parallel connection of the shunt field windings.

For providing the vehicle with the capability of both forward and reverse motion, a reversing switch 253 is provided. With the switch 253 in the illustrated forward position, current flow through the field windings 250, 251, independently of series or parallel operation, is in the upward direction as viewed in the drawing. When the switch 253 is thrown in its opposite or reverse condition, current flow through the field windings 250, 251 is in the opposite direction. The reversing switch 253 illustrates the ease with which reversing is accomplished in the present system, resulting in large part from elimination of the series field. Use of a series field requires reversing of the armature in order to reverse the vehicle direction, which in turn required a reversing switch having sufficient current carrying capacity to handle full armature current. In the present system, reversing can be accomplished simply by reversing the shunt field, allowing use of a switch 253 of considerably lower current carrying capacity.

FIG. 4 also shows the demand sensing circuit 170 in greater detail. It is seen that the signal from the acceleration wiper on input 171 is coupled to the non-inverting input of an operational amplifier 260. The biasing resistors associated with the amplifier 260 provide a predetermined amount of hysteresis so as to establish a differential between entering and exiting the parallel field mode. In one embodiment of the invention, the amplifier 260 is biased so as to initiate entry into the parallel field mode at about 430 amps demanded armature current, but to prevent exit from the parallel field mode until the demand signal drops below about 360 amps. Normally the signal produced by the acceleration wiper and applied to input 171 is not sufficiently negative to swing the output of amplifier 260 low; the resulting high amplifier output, applied to a NOR gate 261 maintains the output thereof low. That low signal, in combination with the contactor enable signal from the starting and safety circuit 160 described previously, causes the output of a NOR gate 262 within gating circuit 173 to swing high, energizing the relay driver 174, which in turn energizes relay 175. Accordingly, the field is maintained in its normal series condition, the contacts 175-1 being closed to connect terminal 262 of winding set 250 to the terminal 263 of winding set 251, thereby connecting the field sets in series and between the positive terminal of the battery and the junction 264 in the mode switching circuitry.

If the signal produced by the acceleration wiper and applied to input 171 becomes sufficiently negative to indicate a demand for 430 or more amps of armature current, the output of amplifier 260 will switch low. Assuming that the lower input to NOR gate 261 is also low, the output thereof will be driven high, causing the output of NOR gate 262 to switch low, de-energizing the relay driver 174 and dropping out relay 175. The inverter 176 applies a low signal to NOR gate 266 within the gating circuit 177, energizing the relay driver 178 and pulling in the relay 179. The power circuit responds by opening contacts 175-1 and closing contacts 179-1 and 179-2 which serve to connect terminal 265 of field winding 251 to the terminal 262 of field winding 250, and also to connect terminal 263 of field winding 251 to the terminal 264 of field winding 250, such that the windings are in parallel and across the propulsion battery 20.

As noted previously means are provided to prevent entry into the parallel shunt mode when operating under field control. Accordingly, input 180 of the command sensing circuit 170 is driven by the $\overline{Q}$ output of mode control flip flop 133 (FIG. 2) such that the input signal is high only in the armature control mode. Such high signal in the armature control mode causes a NOR gate 268 to maintain its output low, thereby enabling the NOR gate 261 to respond to the acceleration demand signal. However, in the field control mode, the input 180 is at a low logic level, which, in combination with low logic level normally produced by an amplifier 269, maintains the output of NOR gate 268 high. In this condition the NOR gate 261 will be prevented from responding to the demand signal, and will maintain its output high irrespective of the level of the armature current demand signal. As a result, the output 172 of the demand sensing circuit 170 will be maintained low, keeping the relay 175 energized and preventing the relay 179 from becoming energized. Accordingly, in the field control mode, field switching to parallel will be prevented.

In order to allow the maintenance of the parallel field condition during and after a switch from armature to field control modes, the output of NOR gate 262 is connected as an input to amplifier 269. Assuming the circuitry has entered the parallel field condition in the armature control mode, the output of NOR gate 262 will be low, such low signal acting on the inverting input of amplifier 269 to maintain the output thereof high. As a result the output of NOR gate 268 remains low, allowing the demand signal acting on amplifier 260 to maintain the system in the parallel field condition even after a switch to the field control mode. In effect, the amplifier 269 overrides the low going signal applied to input 180 after the mode switch so as to maintain the output of NOR gate 268 low. Accordingly, if the system is acting to deliver high torque and the chopper is run to 100% duty cycle, causing a switch from armature to field control mode, such switch will be accomplished without releasing the parallel field condition.

The chopper command signal applied to input 182 of the demand sensing circuit 170 is connected to the summing junction at the inverting input of amplifier 269 in order to cause a return to the series field condition only after duty cycle is reduced below 50%. More specifically, the input 182 is driven from the chopper command signal which becomes increasingly positive for decreasing duty cycle. The summing junction at the inverting input of amplifier 269 is arranged so that the amplifier output switches low at a predetermined level less than 50% duty cycle, such as 40%. As a result, if the system has maintained the parallel field condition during a switch from armature to field control mode, and the duty cycle of the chopper continues to decrease as a result of the high current demand signal, when the duty cycle falls to 40%, the amplifier 269 will switch its output low, such that both inputs to NOR gate 268 are low. Accordingly, the output of NOR gate 268 switches high, driving the output of NOR gate 261 low and returning the system to the series field condition. The chopper duty cycle is automatically increased by the current controlled loop to maintain the amount of field flux in the series condition which had previously been produced in the parallel condition.

Certain operating parameters relating to an exemplary embodiment of the invention will now be provided in order to give some appreciation of the effect of the system described heretofore. In that embodiment a DC motor was used having a continuous armature current rating of about 350 amps. The field was constructed to have a current carrying capacity compatible with the series field connection interposed across the propulsion battery. As a result, the parallel field connection caused higher than rated currents to flow in the field with resulting increased power dissipation and heat generation in the field.

The field was wound so as to produce field flux near saturation for armature currents within expected ratings. However, at times armature currents in excess of ratings were allowed to flow with the result that such high armature currents tended to demagnetize the field and reduce field flux. As a result, the ability of the motor to deliver torque at high armature currents was impaired. Treating the high current demand signal as a transient condition, the field was temporarily switched to the parallel condition, doubling the field current and increasing the field flux to compensate for the demagnetization. As a result, the field was brought back near saturation even at very high armature currents, and reduced battery voltages resulting from high current drain increasing the motor efficiency. The torque per amp figure of merit for the motor was maintained at a high level across all expected operating conditions, even in the overloaded condition.

In the system described in the aforementioned patents, the demand current signal produced by the acceleration wiper had a maximum level of about 500 amps irrespective of the operating duty cycle of the controller. It will be appreciated that it was necessaary for the operator to virtually depress the accelerater to the floor in order to demand the kind of torque necessary to cause a switch to the parallel field mode. In an improved system described in our application Ser. No. 943,873, filed concurrently herewith, and entitled Electric Vehicle Controller With Programmed Motor Current, the demand signal produced by the acceleration wiper is modified in dependence on the operating duty cycle of the controller to allow even greater armature currents at low duty cycles. For example, the maximum demand signal at minimum duty cycle can be about 800 amps, varying to about 500 amps at 100% duty cycle. In that system, the effect of switching to parallel field for transient demands for high torque allows even greater vehicle operational performance.

Attention will now be directed to the cooperation between the mode and field switching circuitry under various operating conditions. During normal operation, when extremely high torques are not demanded, the output 172 of the demand sensing circuit 170 remains low, causing the continuous energization of relay 175 and the maintenance of the normal series mode. Depression of the accelerater to demand an amount of armature current energizes the armature control relay 142, closing contacts 142-1 to connect the armature 201 to the output of the chopper 200, and closes contacts 142-2 to connect to the serially connected motor field to the battery 20. The duty cycle of the chopper 200 is increased from minimum toward maximum in an effort to match the actual armature current with the demand signal. If the duty cycle of the chopper 200 reaches 100% and additional armature current is demanded, the mode control flip flop 133 is caused to change state, energizing relay 146 and de-energizing relay 142. The corresponding contacts react to connect the motor armature 201 directly across the battery, and to connect the chopper 200 via switching diode 206 across the serially connected field windings. The duty cycle may then be decreased by the chopper 200 to further increase the speed of the motor. With the system in that condition, if the demand signal is increased above the switching threshold of amplifier 260, the low $\overline{Q}$ output applied to input 180 of the demand sensing circuit prevents the output thereof from switching high, thereby maintaining the series field condition irrespective of torque demands.

Assuming now that the vehicle is in the armature control mode, with the contacts 142-1 and 142-2 closed, if the demand signal produced by the acceleration wiper and applied to input 171 of the demand sensing circuit 170 rises above the switching threshold of amplifier 260, the output 172 of the sensing circuit will switch high, energizing the relay 179 and de-energizing the relay 175. As a result, the contacts will react, switching the field sets to parallel connection, thereby increasing the field flux. The duty cyle of the chopper 200 is increased toward maximum. If it reaches 100% and additional armature current is demanded, and if the demand signal remains above the drop-out level of 360 amps, the parallel field condition will be maintained while the controller executes an armature control mode to field control mode switch. The duty cycle of the chopper 200 will then be reduced. If it is reduced to 40%, the amplifier 269 will respond to return the system to the series field mode. The system will also return to the series field mode at any time, irrespective of armature or field control modes when the acceleration demand signal on the input 171 falls below 360 amps. Accordingly, the possibility of maintaining the parallel field connection for a great length of time are remote. More specifically, if high armature currents are demanded, the system will switch to field control mode and reduce the duty cycle to cause return to the series mode via amplifier 269. If, on the other hand, the demand signal is reduced, then the amplifier 260 will respond to the reduced threshold to return to the series mode. Accordingly, the system allows the motor to be overloaded for a brief period and in a controlled manner for substantially enhancing performance of the vehicle.

We claim as our invention:

1. In an electric vehicle having a battery power source, a separately excited DC propulsion motor, a power converter for controlling application of power from the battery to the motor, and control means for establishing the operating level of the converter, the improvement comprising at least two sets of shunt field windings in the motor, switch means having a series mode for connecting the winding sets in series with each other and a parallel mode for connecting the winding sets in parallel with each other, the control means including means for detecting a condition of torque demand exceeding a predetermined level, and means responsive to the detecting means and operative on the switch means for temporarily switching to the parallel mode to increase field flux and thereby satisfy said torque demand.

2. The improvement as set forth in claim 1 wherein the converter has an armature control mode wherein the converter controls the armature and the battery is connected to the field, and a field control mode wherein the converter controls the field and the battery is connected to the armature; means switching between said armature and field control modes when the chopper is operating at maximum level, and means for preventing switching of the field winding sets to said parallel mode when the controller is in the field control mode.

3. The improvement as set forth in claim 2 wherein the improvement further comprises means operational in the field control mode for detecting the reduction of the chopper duty cycle to a predetermined level below 50%, and means responsive to the last mentioned detecting means for switching the field winding sets from the parallel to the series mode.

4. The improvement as set forth in claim 1 further including reversing switch means connected to the shunt field windings for reversing current flow therein, thereby to reverse the vehicle.

5. In an electric vehicle for use with a battery power source and having a separately excited DC propulsion motor, a power converter for controlling application of power from the battery to the motor, and control means for establishing the operating level of the converter, the improvement comprising at least two sets of shunt field windings in the motor, switch means having a series mode for connecting the winding sets in series with each other and a parallel mode for connecting the winding sets in parallel with each other, the shunt field having a sufficient number of turns to produce field flux near saturation for rated armature current, the converter having an extended mode of operation for producing short term armature currents in excess of ratings, said excess armature currents causing demagnetization of the field, means for detecting a condition of high armature current, and means responsive to said detecting means for switching the field sets into the parallel mode, thereby to increase the field flux and provide increased torque for the extended mode of operation.

6. In an electric vehicle having a battery power source, a separately excited DC propulsion motor, a power converter for regulating power from the battery to the motor, the improvement comprising means for producing a signal related to actual armature current flow, operator controlled means for producing a signal relating to demanded armature current, a current controlled loop including said power converter for matching the actual current level to the demanded, the propulsion motor having field flux provided solely by a shunt field, said shunt field including at least two sets of shunt field windings, switch means for connecting said sets of windings in series with each other in a series mode and in parallel with each other in a parallel mode, and means responsive to the operator controlled means for detecting a condition of high demanded armature current and in response thereto temporarily switching the switch means to the parallel mode thereby to increase field flux and satisfy said torque demand.

7. The improvement as set forth in claim 6 wherein the detecting means includes means for providing a differential for said high demanded armature current having a first level for engaging the parallel mode and a second lower level for releasing the parallel mode and returning to the series mode.

8. A power converter for an electric vehicle comprising in combination, a pair of input terminals for connection to a DC power source, a variable duty cycle chopper, a propulsion motor having an armature and a shunt field wherein all of the field flux is provided by said shunt field, means for providing a signal indicative of actual armature current, operator controlled means for producing a signal related to demanded armature current, a current controlled loop including the chopper and the motor for causing the actual current to match the demanded current, mode control means for the controller having a armature control mode wherein the chopper is connected to the armature and the battery to the field and a field control mode wherein the chopper is connected to the field and the armature to the battery, switch means for switching from one said mode to the other when the chopper is operating at 100% duty cycle, the shunt field comprising two sets of shunt field windings, switch means connected to the shunt field windings having a series mode for connecting the windings in series with each other and a parallel mode for connecting the windings in parallel with each other, and field control means responsive to a demanded armature current in excess of a predetermined level for temporarily switching the field windings to the parallel mode, thereby to temporarily increase the torque capabilities of the motor.

9. A controller for a DC motor comprising in combination, a power converter for controlling application of power to the motor, control means for establishing the operating level of the converter, at least two sets of shunt field windings in the motor, switch means having a series mode for connecting the winding sets in series with each other and a parallel mode for connecting the winding sets in parallel with each other, the control means including means for detecting a condition of torque demand exceeding a predetermined level, and means responsive to the detecting means and operative on the switch means for temporarily switching to the parallel mode to increase field flux and thereby satisfy said torque demand.

10. A controller for a separately excited DC motor comprising in combination, a power converter for controlling application of power to the motor, control means for establishing the operating level of the converter, at least two sets of shunt field windings in the motor, switch means having a series mode for connecting the winding sets in series with each other and a parallel mode for connecting the winding sets in parallel with each other, the shunt field having a sufficient number of turns to produce field flux near saturation for rated armature current, the converter having an extended mode of operation for producing short term armature currents in excess of ratings, said excess armature currents causing demagnetization of the field, means for detecing a condition of high armature current, and means responsive to said detecting means for switching the field sets into the parallel mode, thereby to increase the field flux and provide increased torque for the extended mode of operation.

* * * * *